(12) United States Patent
Stapelfeld et al.

(10) Patent No.: US 6,360,698 B1
(45) Date of Patent: Mar. 26, 2002

(54) ANIMAL CONTROL SYSTEM

(75) Inventors: Norval Stapelfeld, Nashua, NH (US); Frederic T. Peterson, Chelmsford, MA (US); Thomas Mariner, North Babylon, NY (US)

(73) Assignee: Dogwatch Inc., Natick, MA (US)

( * ) Notice: Subject to any disclaimer, the term of this patent is extended or adjusted under 35 U.S.C. 154(b) by 0 days.

(21) Appl. No.: 09/532,589

(22) Filed: Mar. 22, 2000

Related U.S. Application Data

(60) Provisional application No. 60/125,878, filed on Mar. 24, 1999.

(51) Int. Cl.[7] ............................................. A01K 15/02
(52) U.S. Cl. ................................................. 119/720
(58) Field of Search ........................... 119/720, 721, 119/859, 908

(56) References Cited

U.S. PATENT DOCUMENTS

| | | | | |
|---|---|---|---|---|
| 5,533,469 A | * | 7/1996 | Touchton et al. | 119/908 |
| 5,610,588 A | * | 3/1997 | Yarnall, Jr. et al. | 119/721 |
| 5,815,077 A | * | 9/1998 | Christiansen | 119/720 |
| 6,019,066 A | * | 2/2000 | Taylor | 119/720 |
| 6,095,092 A | * | 8/2000 | Chou | 119/721 |
| 6,135,060 A | * | 10/2000 | So | 119/720 |
| 6,155,208 A | * | 12/2000 | Scheel et al. | 119/720 |
| 6,170,439 B1 | * | 1/2001 | Duncan et al. | 119/720 |

* cited by examiner

*Primary Examiner*—Charles T. Jordan
*Assistant Examiner*—Elizabeth Shaw
(74) *Attorney, Agent, or Firm*—Weingarten, Schurgin, Gagnebin & Lebovici LLP

(57) ABSTRACT

An improved animal control system for controlling the movement of an animal includes a transmitter/control unit for generating a Frequency Shift Keying (FSK) transmit signal, an antenna defining an area and for radiating the FSK transmit signal, and a battery-powered receiver/stimulus unit for receiving and discriminating the FSK transmit signal and for applying a stimulus to the animal upon qualification of the received FSK transmit signal. The system may be used to contain an animal within, or restrict an animal from, the defined area.

43 Claims, 18 Drawing Sheets

ANIMAL CONTROL SYSTEM

CROSS REFERENCE TO RELATED APPLICATIONS

This application claims priority under 35 U.S.C. §119(e) to Provisional Patent Application Ser. No. 60/125,878 filed on Mar. 24, 1999; the disclosure of which is hereby incorporated by reference.

STATEMENT REGARDING FEDERALLY SPONSORED RESEARCH OR DEVELOPMENT

N/A

BACKGROUND OF THE INVENTION

Animal control systems are well-known. Examples of such a system are found in U.S. Pat. Nos. 5,465,687 and 5,353,744, both assigned to the assignee of the present application and incorporated herein by reference. A transmitter generates a coded Amplitude Modulation (AM) signal that is radiated by a wire-loop antenna. The wire-loop antenna is buried a few inches underground and defines an area in which the animal is to be contained or from which the animal is to be restricted. A receiver mounted on a collar placed around the neck of the animal includes one or more electrodes which are in physical contact with the skin of the animal. As the animal and receiver approach the wire-loop antenna, the receiver detects the radiated AM signal. The received signal is measured and, if the received signal qualifies, a stimulus is applied to the animal. The stimulus may be an audible alert or an electric shock administered to the animal through the electrodes.

While AM-based systems have been relatively successful, their performance suffers from noise, interference and other extraneous problems that may cause a stimulus to be improperly applied to the animal. Therefore, what is needed is an improved animal control system that provides more robust performance and less susceptibility to noise, interference and other reception problems associated with AM-based systems.

BRIEF SUMMARY OF THE INVENTION

An improved system for controlling the movement of an animal employs a Frequency Shift Keyed (FSK) transmit signal wherein a carrier is frequency shifted, or modulated, to either a Mark frequency or a Space frequency. The FSK transmit signal supports the transmission of user-programmable data from a transmitter/control unit to a receiver/stimulus unit typically mounted on a collar placed around the neck of the animal. The FSK transmit signal has a frame structure that includes a leader sequence, a data portion, and a gain test sequence. The leader sequence indicates the start of a frame, the data portion specifies the type and rate of the stimulus applied to the animal, and the gain test sequence is used to equalize receiver response to the Mark and Space frequencies. The FSK transmit waveform improves system performance to thereby lessen the probability of a stimulus being improperly applied to the animal.

The receiver/stimulus unit is battery powered and operates with very low power consumption and having a sleep mode to conserve power. The receiver includes a programmable memory for programming of various system parameters.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
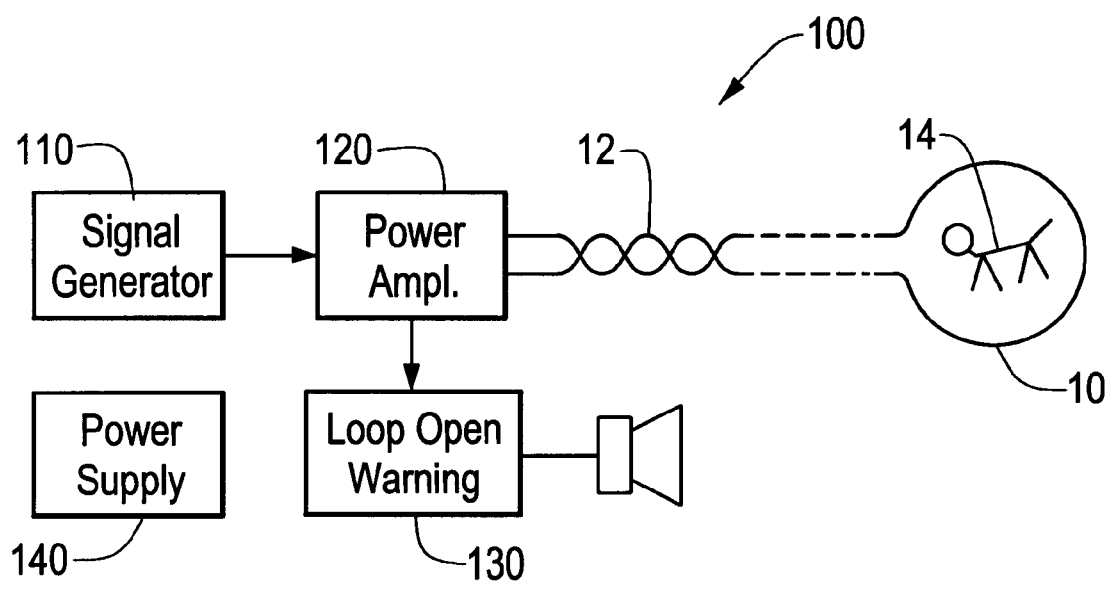
FIG. 1 is a block diagram of an animal control system incorporating the invention.
Figure 1:
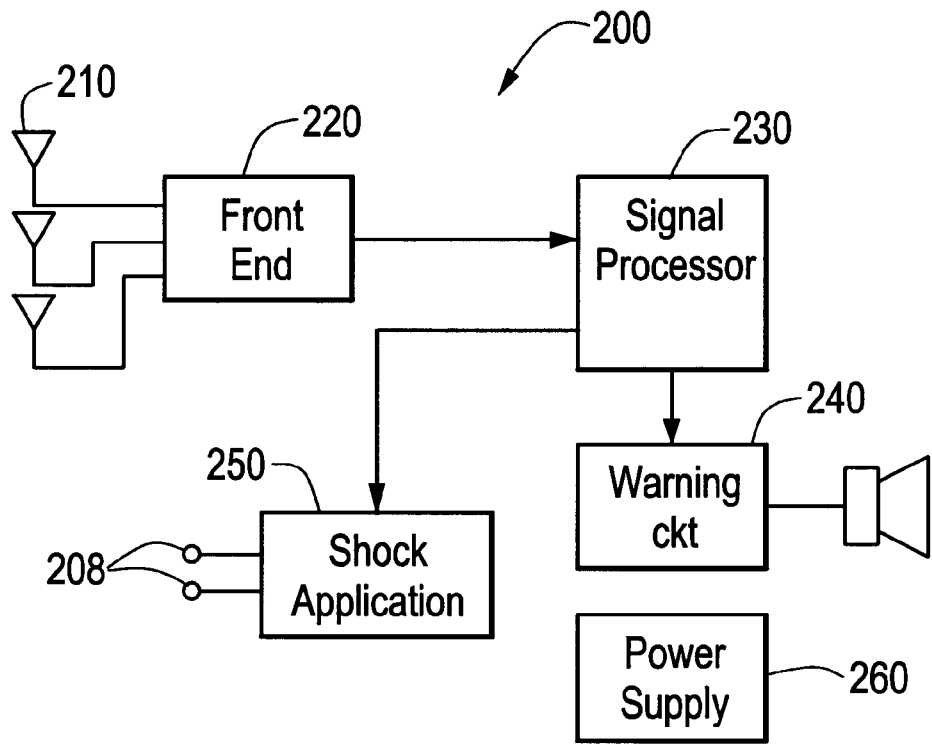

A block diagram of a system for controlling the movement of an animal, typically a family pet and most commonly a dog, is illustrated in FIG. 1. The system comprises a transmitter/control unit 100 for generating a frequency shift keyed (FSK) transmit signal, a wire-loop antenna cable 10 for radiating the FSK transmit signal, and a receiver/stimulus unit 200 for applying a stimulus to an animal 14 upon detection of a qualified FSK transmit signal. The transmitter/control unit 100 is typically sheltered and accessible to a user for programming the type and rate of the stimulus to be applied to the animal. The transmitter/control unit 100 data modulates the stimulus type and rate information onto the FSK transmit signal. The antenna cable 10 is installed around the perimeter of a protected area and is typically buried approximately four inches underground. The antenna cable 10 operates as a simple magnetic field induction loop antenna and includes a twisted connecting portion 12 for connecting to the transmitter/control unit 100.

The receiver/stimulus unit 200, preferably mounted on a collar placed around the neck of an animal 14, detects the radiated FSK transmit signal as the animal approaches the perimeter of the defined area. The animal is usually confined within the area, although the animal may alternatively be restricted from the area. The receiver/stimulus unit 200 applies a stimulus to the animal based on the stimulus information contained in the received FSK transmit signal. A protocol for conditioning the animal to the animal control system is disclosed in both of the above-referenced U.S. Pat. Nos. 5,465,687 and 5,353,744 which are incorporated herein by reference. The typical animal learns very quickly to stay away from the perimeter and to either remain within, or stay outside of, the defined area.

The transmitter/control unit 100 comprises a signal generator circuit 110, a power amplifier circuit 120, a loop-open warning circuit 130, and a power supply circuit 140 usually energized from a standard domestic source via an AC adapter. The receiver/stimulus unit 200 comprises an antenna assembly having three antennas 210 arranged along mutually orthogonal axes, a front-end circuit 220, a signal processor circuit 230, a warning circuit 240, a shock application circuit 250, coupled to electrodes 208 and a power supply circuit 260 which is battery powered.

Figure 2:
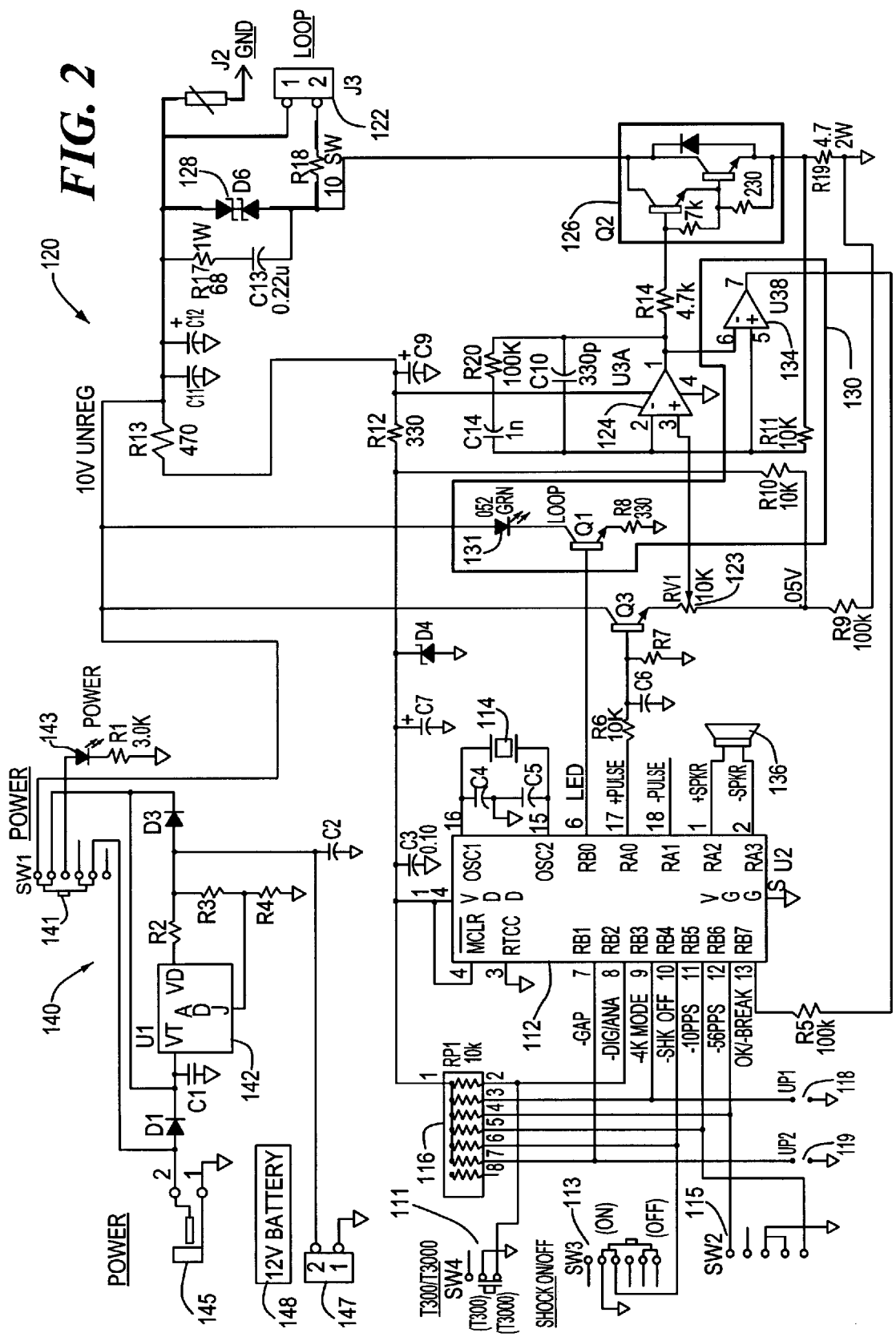
FIG. 2 is a more detailed block diagram of the transmitter/control unit of the animal control system of FIG. 1.

The transmitter/control unit is shown in greater detail in FIG. 2. The power supply circuit 140 includes a back-up battery 148, an adjustable voltage regulator circuit 142, a zener diode D4, and various current-blocking diodes, current-limiting resistors and filter capacitors as shown. Input power, typically at 18 volts, is applied to the transmitter/control unit 100 through an input power connector 145 and power switch 141. The presence of an input voltage illuminates a power indicator LED or other lamp 143. The input power is applied to the power amplifier circuit 120, and zener diode D4 steps the input voltage down to 5.1 volts to provide a power rail for the digital circuitry.

The adjustable regulator circuit 142 produces a regulated DC voltage, typically 12 volts, which is routed to a battery connector 147 to which a backup battery 148 is connected. In normal operation, the regulated DC power is used to maintain a charge on the rechargeable backup battery, such as a Powersonic PS 1242, that is connected to the battery connector 147. When a power failure is experienced, the backup battery supplies power to maintain circuit operation and thereby prevent the animal from wandering into or out of the protected area.

The signal generator circuit 110 comprises a microcontroller 112, such as the PIC16C621A microcontroller manufactured by MicroChip Technology Inc. The microcontroller 112 executes a below-described routine to generate an FSK transmit waveform, depending on the position of mode switch 111. The signal generator circuit 110 further comprises a quartz crystal 114, typically having a resonant frequency of 8,388,608 Hz, that is used to set the operating frequency of the microcontroller. As will be discussed below, the carrier frequency of the transmit signal and the rate of data modulated onto the carrier are related to the operating frequency. The control lines from the mode switch 111, a shock on/off switch 113 and a shock rate switch 115 are pulled up to the digital rail through separate resistors of a pull-up resistor pack 116. The system may also be set to a 4192 k Hz mode, wherein the carrier frequency of the transmit signal is reduced by half, by installation of a jumper wire in a 4192 k Hz mode jumper socket 118 to pull down the 4192 k Hz mode control line. A spare jumper socket 119 is also provided for pull down of a control line such as for adjustment of transmit timing parameters.

The power amplifier circuit 120 includes a gain adjust transistor Q3 and a gain potentiometer 123, a low-pass buffer amplifier 124 and a feedback capacitor C10, a power Darlington amplifier 126, a current-sense resistor R19, a back to back diode surge arrestor 128, and a series load resistor R18. A power output connector 121 is connected to the antenna cable by way of a mating connector. The level potentiometer 123 is adjusted to achieve the desired activation distance from the loop antenna.

A loop-open detection circuit 130 includes a loop OK indicator LED 131, a transistor Q1 for driving the indicator 131, and a loop detection comparator 134. The comparator 134 monitors the output of the low-pass buffer amplifier 124, whose output will rise to the input voltage rail when and if the output current flow stops causing the voltage across the current sense resistor R19 to fall to zero. This loop-open fault condition will occur when a break occurs in the antenna cable 10 and may also occur if the power amplifier 126 fails. The output of the loop detection comparator 134 is fed to the microcontroller 112 which causes illumination the loop indicator LED 131 during normal cable operation and generates an audible warning tone, typically 4 KHz, audible through a piezo-electric speaker 136, if an open cable condition is detected. It is essential that the user be warned of an loop-open fault condition because of the risk of the animal wandering away from (or into) the protected area.

Figure 3:
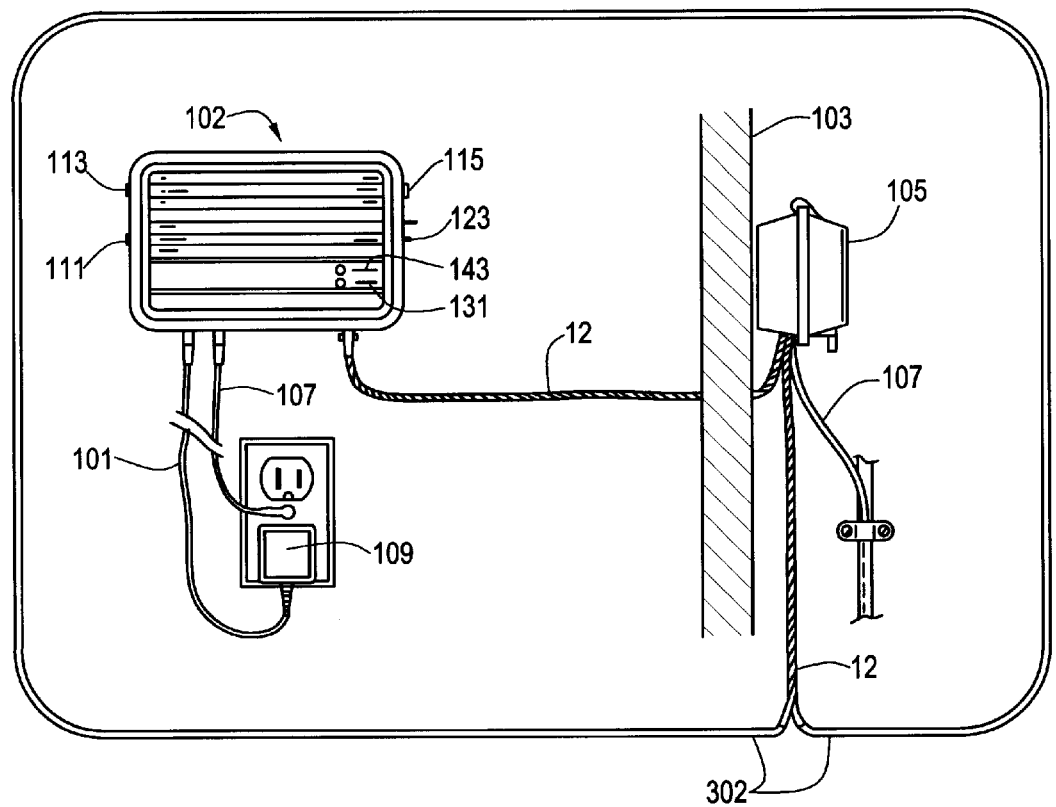
FIG. 3 is an illustration of a transmitter/control unit in a typical installation.

Referring to FIG. 3 the transmitter circuitry is included within a small enclosure 102 which is coupled to the loop antenna via a twisted wire interconnection 12. The transmitter housing is typically mounted on a wall in a garage or other inside location protected from the outside environment. The twisted wire is fed through an outside wall 103 to a surge protector 105 which protects the transmitter from electrical surges due to lightning and other causes. The surge protector and transmitter are grounded by a grounding wire 107. The transmitter is powered from a low voltage adapter 109 which is in turn powered from a standard 120 volt outlet. The transmitter enclosure includes a power on-off switch 113, a shock rate selector switch 115, a stimulus selector switch 111 and a gain or range adjustment control 123. The enclosure also includes a power indicator light 143 and a loop indicator light 131.

The rate selector switch 115 selects a slow, medium or fast shock rate. The selector switch 111 selects the stimulus mode, such as audible only or audible plus shock. The range control 123 provides adjustment of the antenna field strength to increase or decrease the effective width of the avoidance zone. The power indicator light 143 is illuminated when the transmitter is connected to a power source and the on-off switch is on. The loop indicator light 131 is illuminated if electrical continuity is maintained in the loop antenna. If electrical continuity is lost or if the signal is otherwise interrupted the loop indicator is extinguished and an audible alarm is sounded to warn of the loss of signal.

Figure 4A:
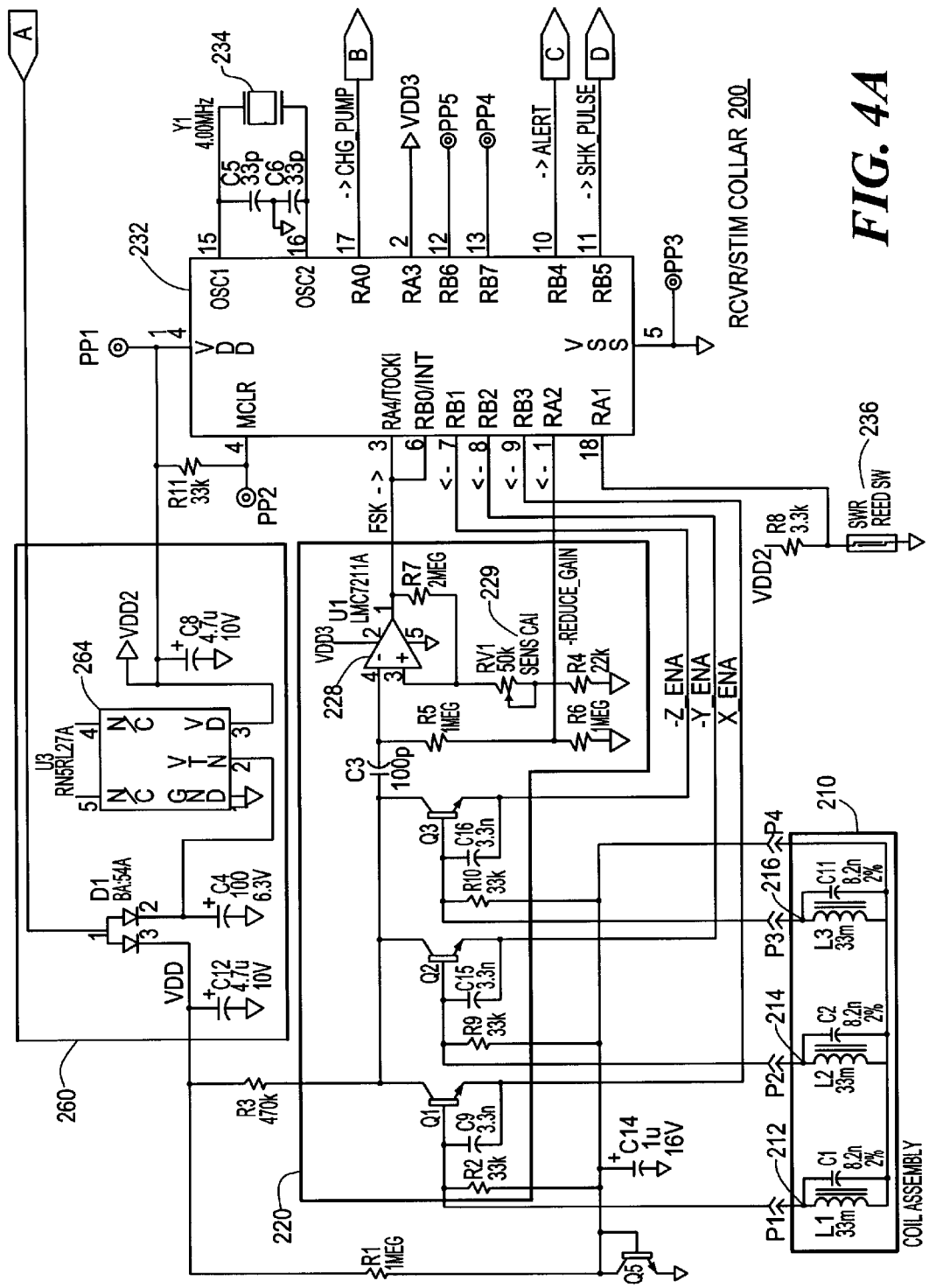
FIGS. 4A–4B are detailed block diagrams of the receiver/stimulus unit of the animal control system of FIG. 1.
Figure 4B:
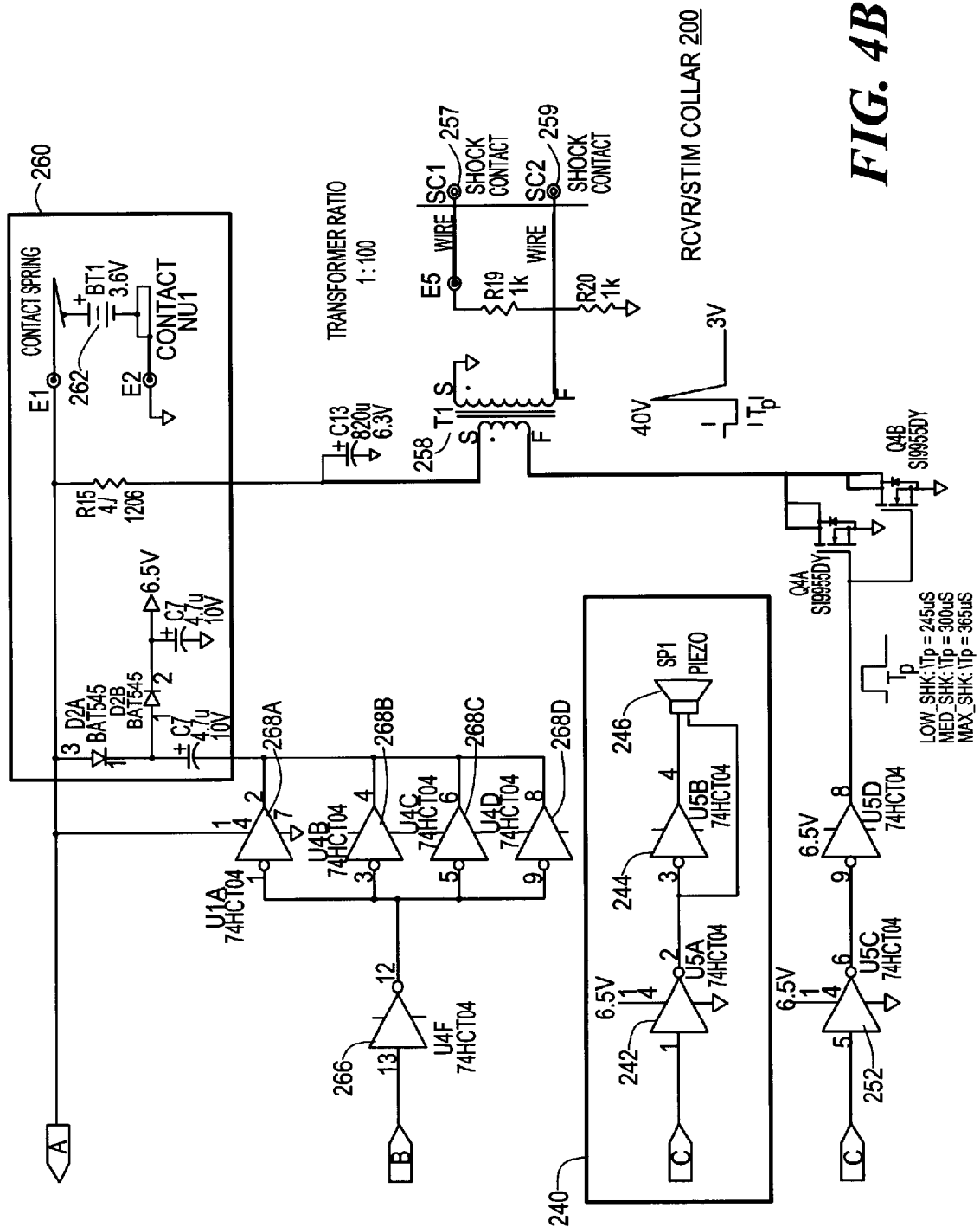

The receiver/stimulus unit is shown in greater detail in FIGS. 4A and 4B. The power supply circuit 260 comprises a replaceable 3.6 volt battery 262, a 2.7 volt regulator 264, and various current-blocking diodes, current-limiting resistors and filter capacitors as shown. A charge pump circuit comprising a driver inverter 266 and a bank of parallel-connected inverters 268A–268D is used to raise the level of the voltage supplied to the warning circuit 240 and shock application circuit 250 to approximately 6.5 volts. The charge pump is driven by a charge pump control signal generated by the microcontroller 232. During non-stimulus periods, the change pump control signal is pulsed each time the receiver wakes up from a sleep mode. During a stimulus period, the charge pump control signal is pulsed at the stimulus application rate.

The front-end circuit 220 includes separate gain transistors Q1, Q2 and Q3 for the received X-direction, Y-direction and Z-direction signals, respectively, to provide circuit redundancy so that the system still operates in at least one direction if one or two of the gain transistors fail. The gain transistors are sequentially enabled so that at any one time only a single received signal is present at the input of a comparator amplifier 228. The microcontroller 232 can adjust the level of the input signal via a gain reduction control signal. When the gain reduction control signal is brought to ground, the level of the input signal is reduced, typically by 8%. A calibration potentiometer 229 is used at the time of manufacture to adjust the sensitivity of the comparator amplifier 228.

The signal processing circuit 230 (FIG. 1) comprises a microcontroller 232, such as a PIC16LF84 microcontroller manufactured by MicroChip Technology Inc. The microcontroller 232 executes a below-described routine to detect and decode the received signal. The signal processor circuit 230 further comprises a frequency control element, which preferably is a ceramic resonator 234, typically having a resonant frequency of 4 MHz, that is used to set the operating frequency of the microcontroller. The resonator has a low Q to achieve a fast start up. A switch 236 such as a reed switch is used to perform local programming, such as shock level, transmitter mode and operating frequency. The reed switch is activated by a magnetic probe placed in proximity to the switch to activate it. The microcontroller 232 also generates the X-direction enable, Y-direction enable, Z-direction enable and reduce gain control signals.

The warning circuit 240 comprises a series-connected pair of inverter buffer/driver amplifiers 242, 244 and a piezoelectric speaker 246 for generating an audible tone from an alert signal produced by the microcontroller 232. In this embodiment, an audible tone is always generated when the FSK transmit signal is detected.

The shock application circuit 250 comprises a series-connected pair of inverter buffer/driver amplifiers 252, 254, a parallel-connected pair of mosfet power transistor switches Q4A and Q4B, a transformer 258, and first and second electrodes 257, 259. The transformer preferably has a primary-to-secondary winding turns ratio of 1 to 100. When a electrical stimulus is enabled, the power transistor switches are turned on for a predetermined time period, such as 245 microseconds for low shock, 300 microseconds for medium shock and 365 microseconds for high shock. The current flow through the primary winding of transformer 258 induces a current pulse in the secondary winding. The current in the secondary winding flows out of the second electrode 259, through the skin of the animal, and back into the first electrode 257. Shock pulses are applied at either a low 10 pulse-per-second (PPS), medium 32 PPS or high 58 PPS rate. Frequency control is sufficiently precise to achieve 1 microsecond resolution to precisely control the pulse width and thus the shock voltage applied to the animal.

If the pet remains or lingers in the activation zone for a predetermined period of time, typically 10 seconds, the shock stimulus is stopped and then restarted if the pet is still in the activation zone.

Figure 5:
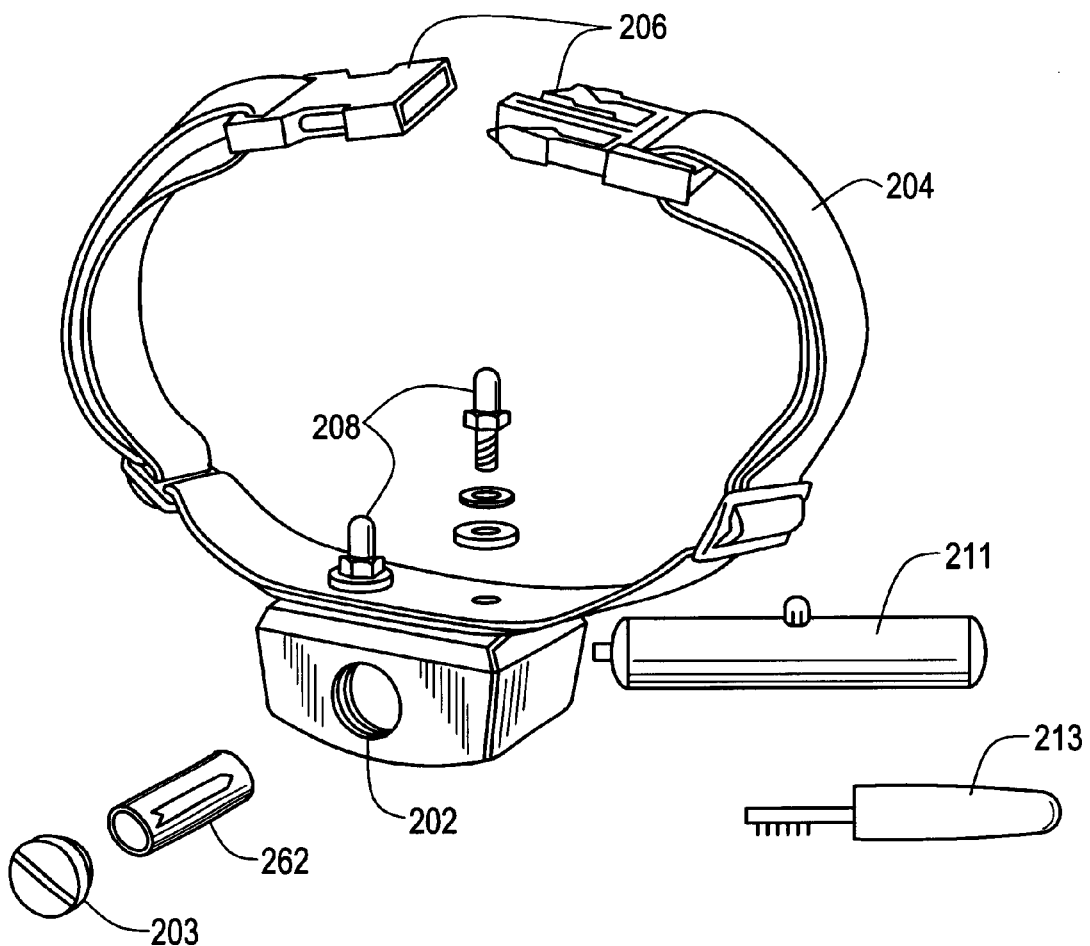
FIG. 5 is a pictorial illustration of the receiver/stimulus unit affixed to a dog collar.
Figure 6A:
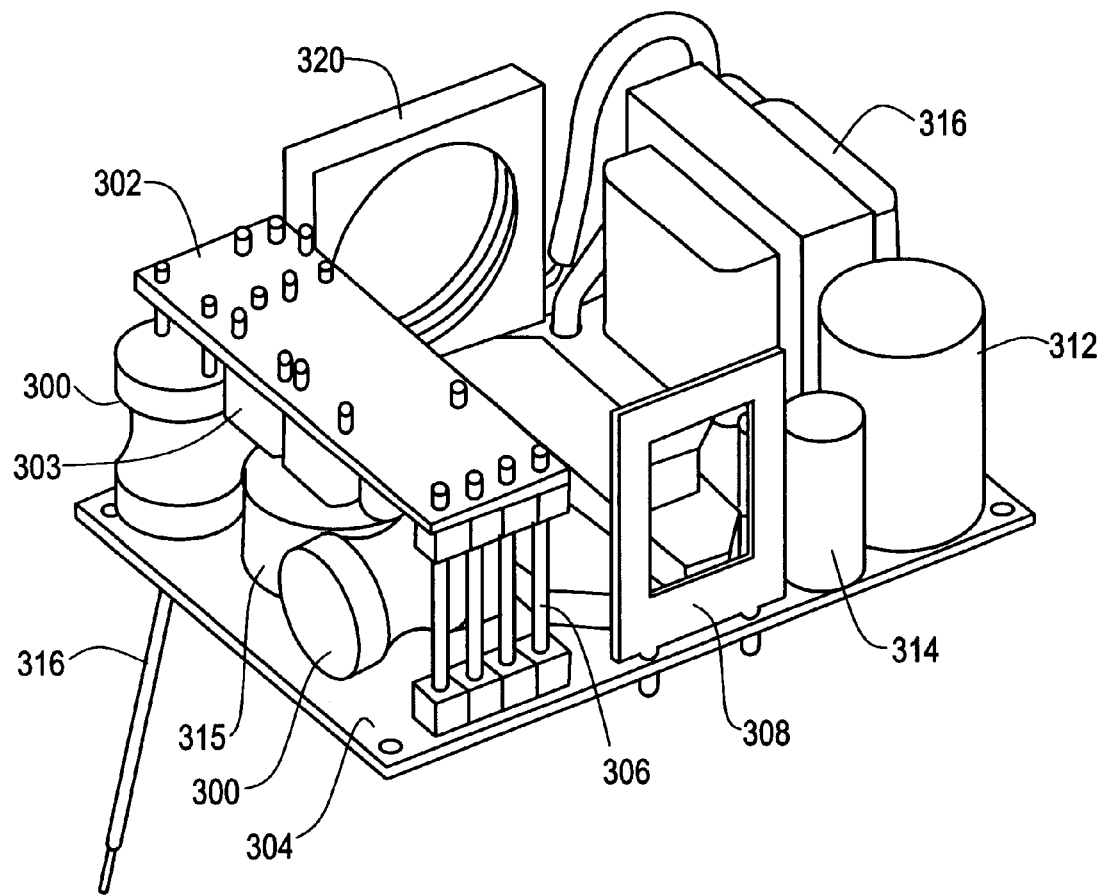
FIGS. 6A–6C are perspective views of the internal circuitry of the receiver/stimulus unit of FIG. 5.
Figure 6B:
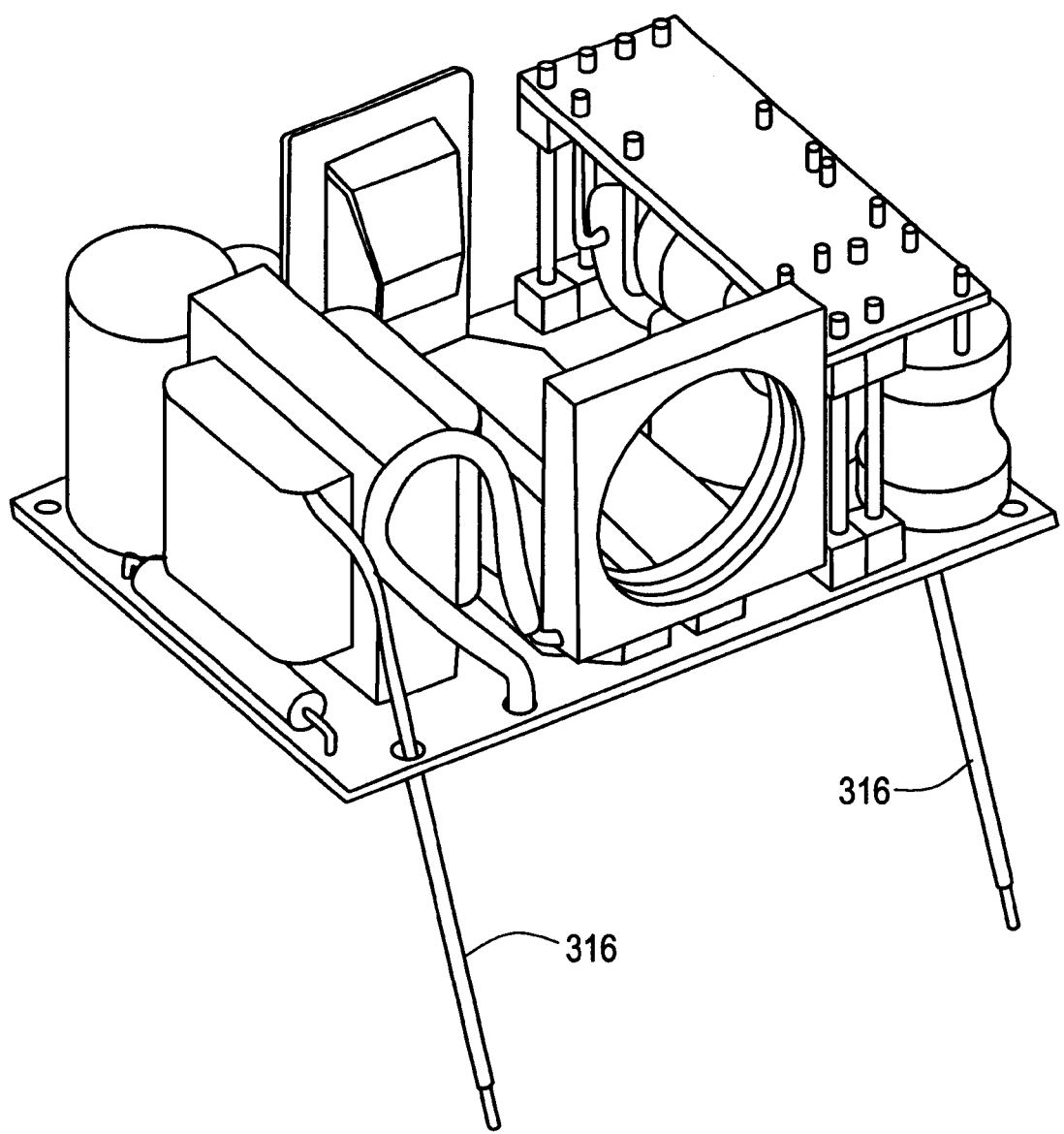
Figure 6C:
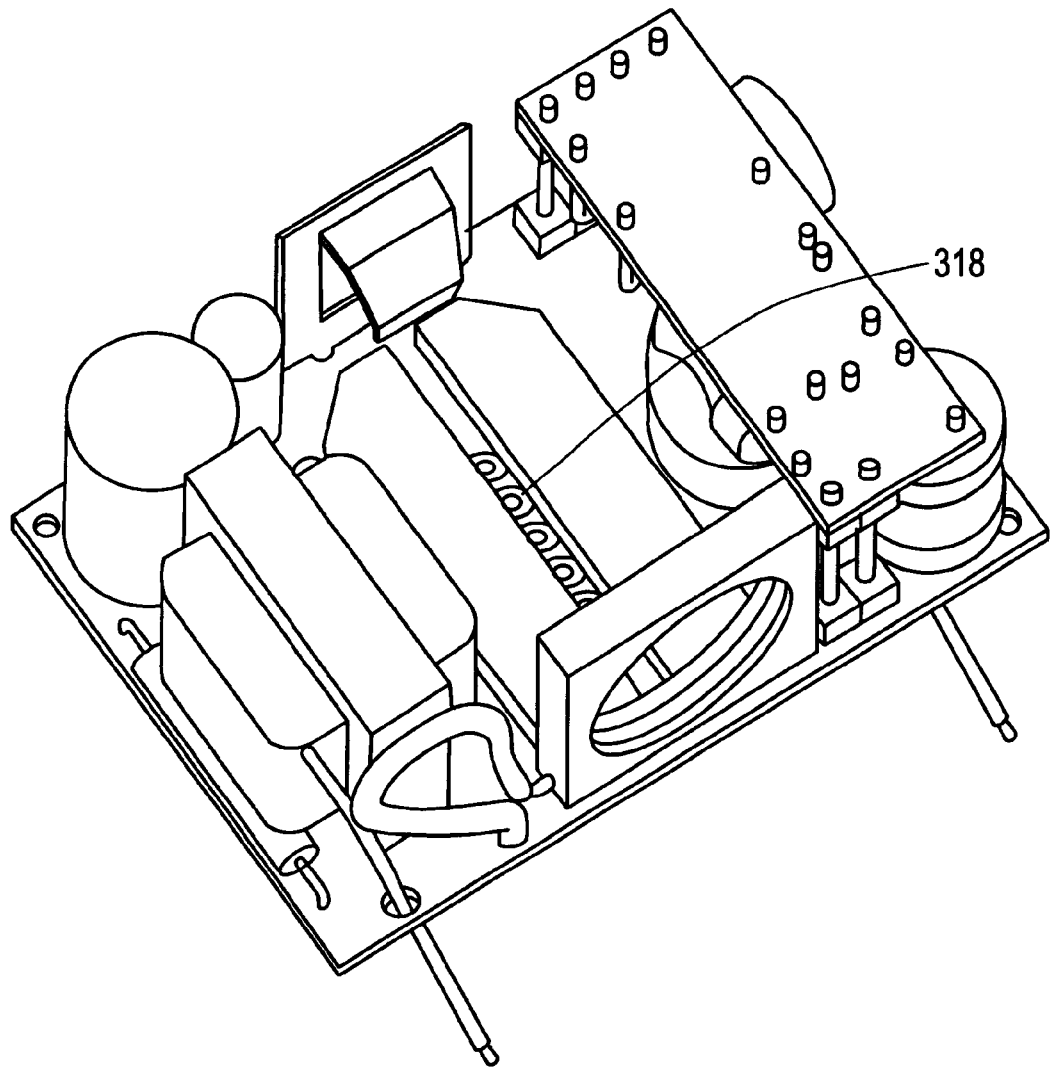
Figure 6D:
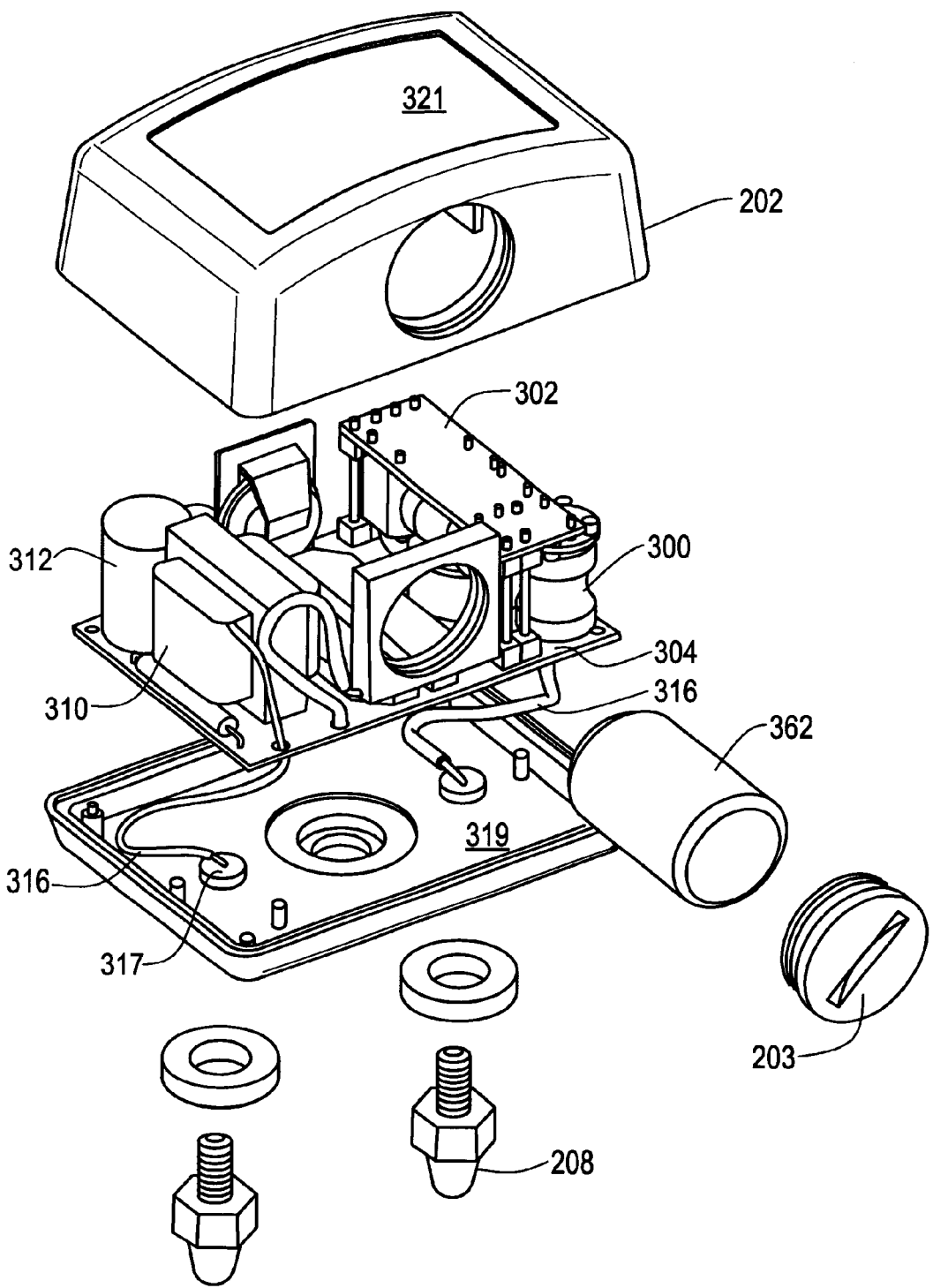
FIG. 6D is an exploded pictorial view of the receiver/stimulus unit.

The receiver/stimulus circuitry is housed as shown in FIG. 5. A waterproof enclosure or case 202 is affixed to a length-adjustable strap 204 having a clasp or buckle 206 to facilitate removable mounting of the unit 200 around the neck of the animal. The electrodes 208 protrude from the enclosure 202 and are operative to press against the animal's skin for application of the electrical shock. The electrodes 208 also serve as a mechanical means for affixing the enclosure 202 to the strap 204 by way of threaded ends and washers as shown. A replaceable battery 262 is held within the enclosure 202 by a retaining cap 203. Programming can be accomplished with a magnetic probe 211 which activates the reed switch 236, as discussed above. A multi-pin probe 213 is employed with the test socket for programming of the microprocessor memory.

The receiver circuitry is packaged as shown in FIGS. 6A–6D. The antenna coils 300 are mounted on a circuit board 302 on which is also mounted associated capacitors 303. This circuit board 300 with the mounted antenna coils and capacitors forms an antenna subassembly which is connected to circuit board 304 by connectors 306. The receiver circuitry is mounted on circuit board 304 which also contains a battery mount 308, transformer 310 which provides the shock voltage, energy capacitor 312 and decoupling capacitor 314 and speaker 315. The output leads 316 are connected to output terminals 317 on the receiver case which in turn are connected to electrodes 208 for providing the shock to the animal. The circuit board 304 also contains a plurality of sockets 318 which are accessible to a multi-pin probe 203 (FIG. 5) which can be inserted through the battery opening in the case via battery fitting 320 and plugged into the sockets 318 to provide a connection for programming or reprogramming of the memory.

The case 202 has a bottom 319 and a top 321 which contain the circuitry and which are bonded together to form a waterproof enclosure which is unaffected by rain, dirt and other contaminants when in use on an animal.

Figure 7:
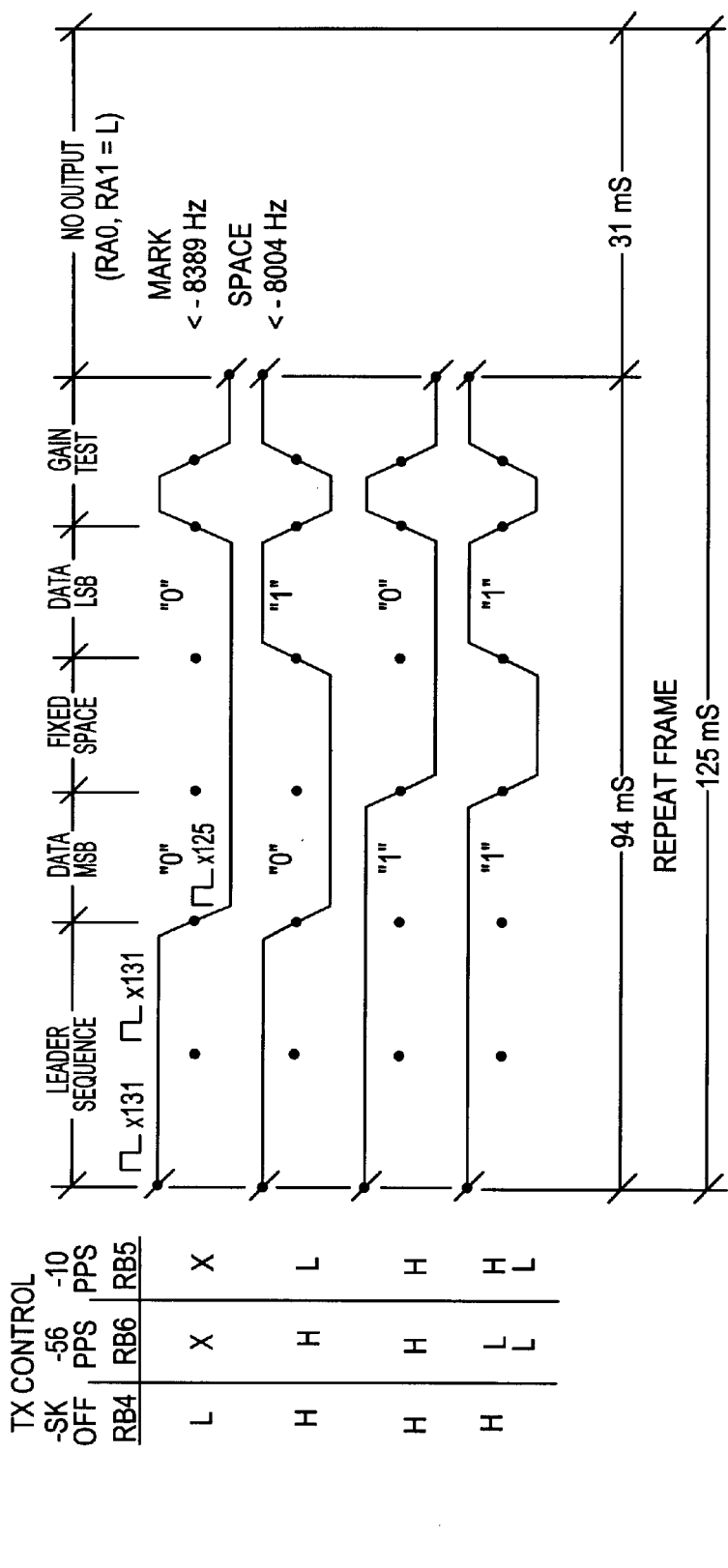
FIG. 7 is an illustration the FSK transit signal waveforms generated by the signal generator of the transmitter/control unit of FIGS. 2A and 2B.
Figure 7:
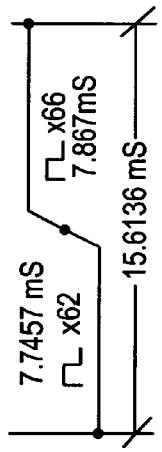

The operation of the transmitter/control unit 100 is discussed in reference to the FSK waveform timing diagram of FIG. 7. Unlike a conventional AM waveform, no inactive periods are required in the FSK transmit signal.

The FSK system operates at a nominal FSK carrier frequency of 8192 Hz which is frequency shift keyed to either a Space frequency (data bit=logic zero), preferably 8004 Hz, or a Mark frequency (data bit=logic one), preferably 8389 Hz. The Mark frequency is approximately 2.5% above the nominal carrier frequency and the Space frequency is approximately 2.5% below the nominal carrier frequency. For the above-specified carrier frequency, a basic transmit interval, or event, is either a Mark or Space frequency having a nominal 7.8125 ms duration and a baud rate of 128 intervals per second. However, a pair of intervals is used to transmit a single data bit symbol, so the effective baud rate is 64 data bits per second.

The signal generator 110 produces one of the four FSK signaling waveforms shown in FIG. 7, as determined by the status of the shock on/off switch 113 and the shock rate switch 115. Each waveform has a basic 125 ms frame structure, with a frame comprising a four interval Mark leader sequence, a most significant bit (MSB) data bit consisting of a two interval Space or Mark, a two interval fixed Space separator sequence, a least significant bit (LSB) data bit consisting of a two interval Space or Mark, a gain test sequence, and an interframe gap. The frame rate is eight frames per second.

The four interval Mark ("MMMM") leader sequence defines the beginning of a signaling frame. Each Mark interval pair ("MM") has a total length of 131 instruction cycles. The interval immediately preceding the leader sequence may be a Space or no signal, but it cannot be a Mark. If the shock on/off switch 113 is set to a "zero" logic level to inhibit shock, the leader sequence is followed by six consecutive Space intervals ("SSSSSS") consisting of a two Space MSB data bit ("SS") having a length of 125 instruction cycles, a fixed, two Space separator sequence ("SS") having a length of 125 instruction cycles, and a two Space LSB data bit ("SS") having a length of 125 instruction cycles.

When shocking is enabled, i.e., the shock on/off switch 113 is set to a "high" logic level, the status of the shock rate switch 115 determines the rate of shock pulses applied to the animal. When the 58 PPS shock rate is selected, the MSB and LSB data bits are both set "high" and their corresponding MSB and LSB intervals are both set to Mark pairs ("MM") to produce a "MMSSMM" sequence after the leader sequence.

When the 32 PPS shock pulse rate is selected, the MSB data bit is set high and the MSB intervals are set to a Mark pair ("MM"), while the LSB data bit is set low and the LSB intervals are set to a Space pair ("SS") to produce a "MMSSSS" sequence after the leader sequence.

When the 10 PPS shock pulse rate is selected, the MSB data bit is set low and its corresponding MSB intervals are set to a Space pair ("SS"), while the LSB data bit is set high and its corresponding LSB intervals are set to a Mark pair ("MM") to produce a "SSSSMM" sequence after the leader sequence.

The gain test sequence is a Mark interval followed by a Space interval ("MS"), or a Space followed by a Mark ("SM"), depending upon whether the sequence follows a Space or a Mark, respectively. The gain test sequence has a length of 128 instruction cycles with the first interval having a length of 62 instruction cycles and the second interval having a length of 66 instruction cycles.

The interframe gap is an approximately 31 ms time period between the gain test sequence and the start of the leader sequence. Although no transmission need be made during this gap, it may be filled with a transmission at any frequency, other than the Mark frequency. Therefore, no inactive waveform periods are required.

The operation of the receiver/stimulus unit 200 is described with reference to the flow charts of FIGS. 8–14. The signal processor 232 operates as a state machine processor which includes a multi-thread operating system having a number of threads to be activated periodically. The threads include: a Receive thread that detects and demodulates the received signal, a Signal Interpreter/Stimulus thread that determines when and what type of stimulus to apply, an Antenna Service thread which controls the antenna that is receiving a signal, a Sleep thread that determines if and how to enter a low power mode, and a Switch Action thread that debounces the switch and interprets the results.

In general the microcontroller 232 determines whether the Mark frequency is present and if the Mark frequency is detected, the microcontroller locks onto the Mark frequency (step 120) and when the frequency lock procedure is completed, the microcontroller 232 takes the appropriate action, i.e. stimulates the pet, based on the programming mode.

If the Mark frequency is not detected, the next antenna is selected. The microcontroller determines whether the antenna has already been selected, and if the antenna has not been previously selected, the microcontroller reenters the correlation procedure. If the selected antenna has already been selected, the microcontroller determines whether a programming change is to be performed. If a programming change is to be performed, the microcontroller sets the programming mode. If a programming change is not to be performed, the microcontroller reenter the sleep state.

Security against false signals is provided by a decoder or qualifier sequence that discriminates against out of tolerance Mark and Space frequencies. For a received FSK signal to be qualified a total of five signal intervals must meet the Mark and Space frequency criteria. A successful decode detects two intervals of a Mark signal followed by a single interval of data followed by a single interval of a Space signal. The following interval is data. A gain test sequence, which is a Mark-Space or a Space-Mark, is used to determine the strength of the received signal. Upon receipt of a qualified data sequence, the gain is reduced over the gain test interval by a predetermined amount, for example, eight percent. If the signal is still detected after reducing the gain then the signal is considered a strong signal.

When a strong signal is detected, an initial shock and audible alert are provided to the animal. If the signal is not detected after the gain reduction the signal is considered weak, and only an audible alert is provided.

Figure 8:
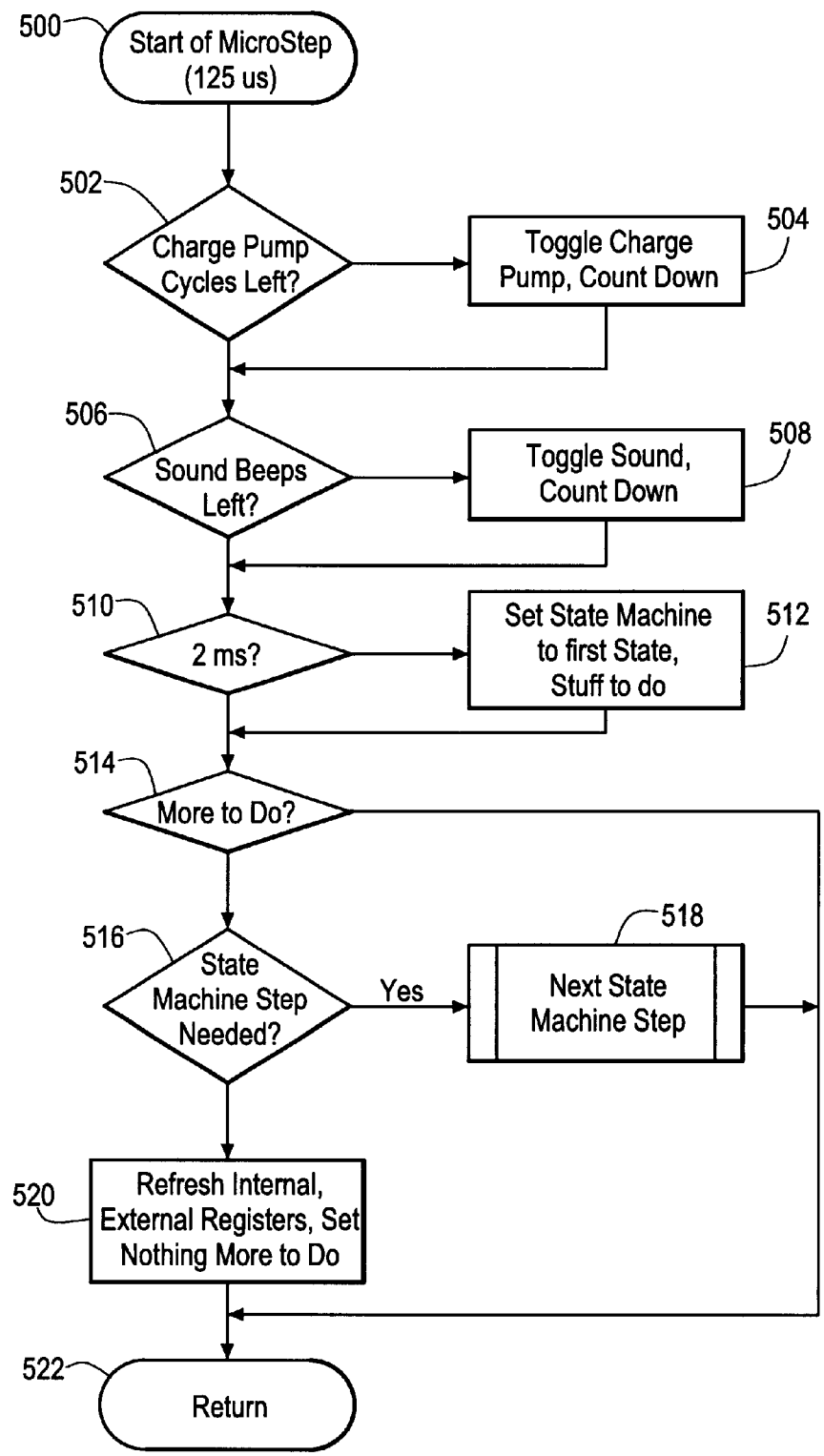
FIG. 8 is a flow chart of the multi-thread state machine operation executed by the receiver/stimulus unit.

FIG. 8 illustrates the state machine, which is in an idle mode when steps for all other actions are complete. At a fixed microstep time (500) the machine tests if any toggle cycles are left to be performed on the charge pump (502). If there are remaining cycles, the charge pump is toggled and the count of remaining pumps is decremented. A test is then made (506) if any audible cycles are left to execute. If they are, the sound output is effected and the count of cycles is decremented (508). If 2 ms has elapsed since last resetting of the machine (510), the State machine is reset at the top of the list of tasks to be executed and a signal given that there are tasks to execute (512). If there are tasks to perform, the present state machine step is queried (514) to determine if it is time to execute the next task (516). If task execution is required, a program step is begun at a predetermined location (518). Once the program step has been completed it returns to the state machine. If the last task has been executed, hardware registers are reset to proper values to assure they have not been electrically disturbed and the signal is cleared (520) denoting that the tasks have been executed. The state machine goes into a wait state until the microstep time has again elapsed (522).

Figure 9:
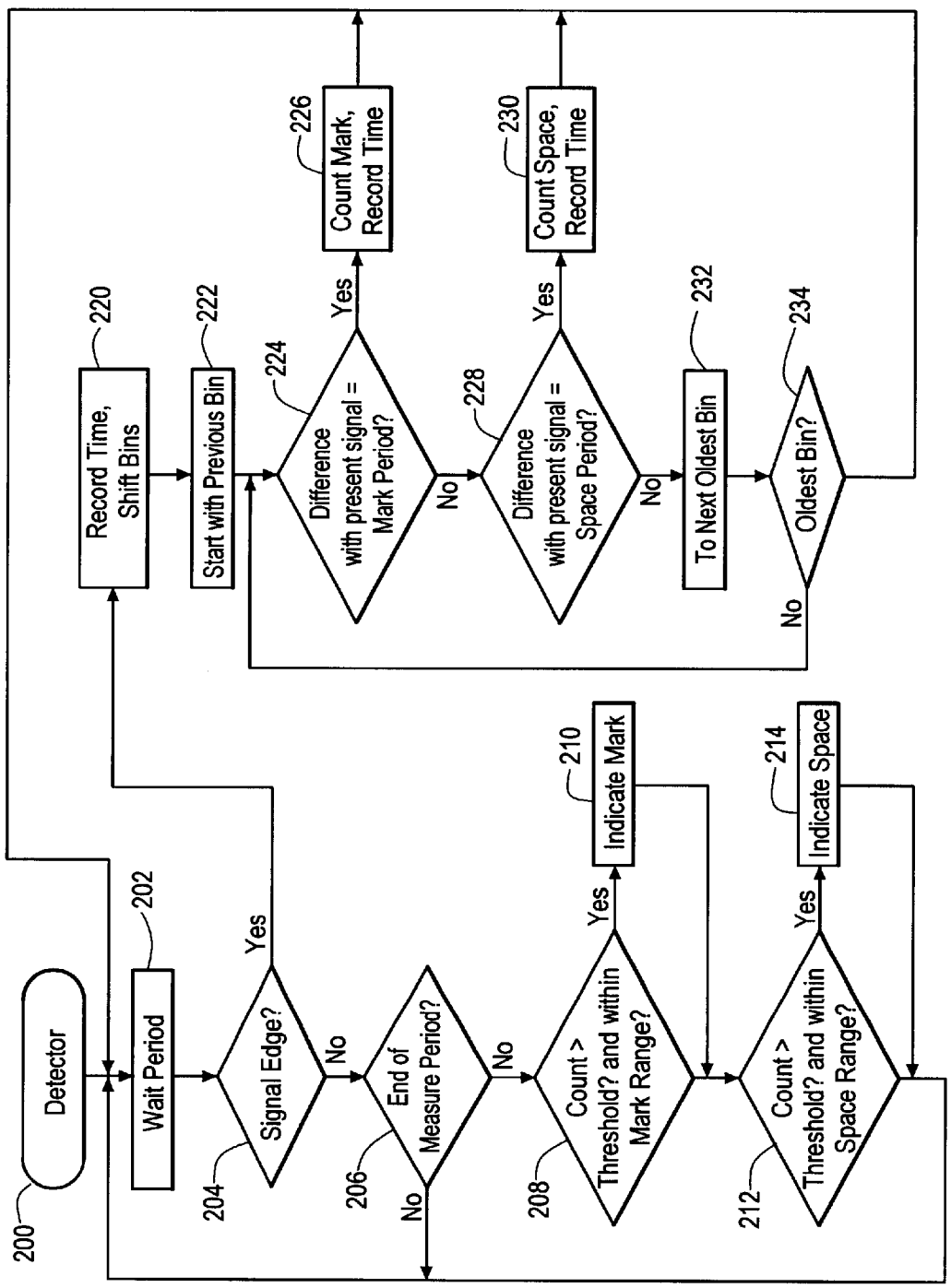
FIG. 9 is a flow chart of a FSK signal acquisition procedure executed by the signal processor of the receiver/stimulus unit of FIG. 4.

The signal acquisition procedure in which the input signal on the selected antenna is tested for Mark or Space FSK signals is shown in FIG. 9. The detector (200) executes a wait period (202) which is interrupted when a signal edge occurs (204). Upon signal edge detection, the time is recorded (220). Beginning with the previous time storage bin (222) the difference between the signal edge time and a previously recorded time is compared (224), (226). If the difference is within the parameters of a Mark period, then a mark signal is counted (226). If a Space period is detected then a space event is counted (230). Each previous time recording is examined (232) until the limit of time bins is exceeded (234). If a measure period has been met (206), then the number of mark events is examined to determine if sufficient mark frequency periods have been received (208). If they have, a Mark is indicated (210). The number of space events is examined to determine if sufficient events have occurred (212) to indicate the frequency as a space (214). The entire cycle is then repeated.

Figure 10:
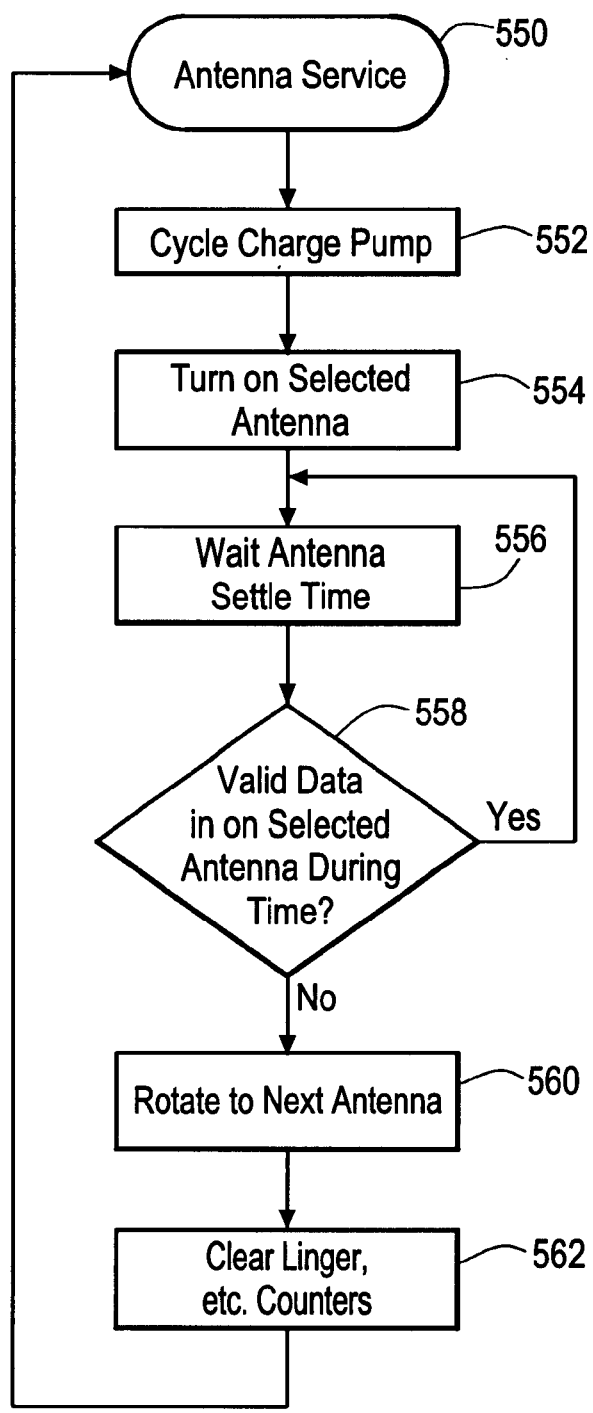
FIG. 10 is a flow chart of the antenna selection procedure of the receiver/stimulus unit.

The procedure by which the X-direction, Y-direction or Z-direction antenna is selected is shown in FIG. 10. When an antenna is to be selected (550), the charge pump is ordered to be cycled (552), the selected antenna circuit is turned on and all other antenna circuits turned off (554). The settle time provides a delay sufficient for signal acquisition (556). If a valid data bit is received during the delay, the settle time is reset and the delay begun again (556). If the test for valid data (558) fails, the next antenna is selected (560), the linger time is reset (562) and the antenna service 550 is begun again.

Figure 11:
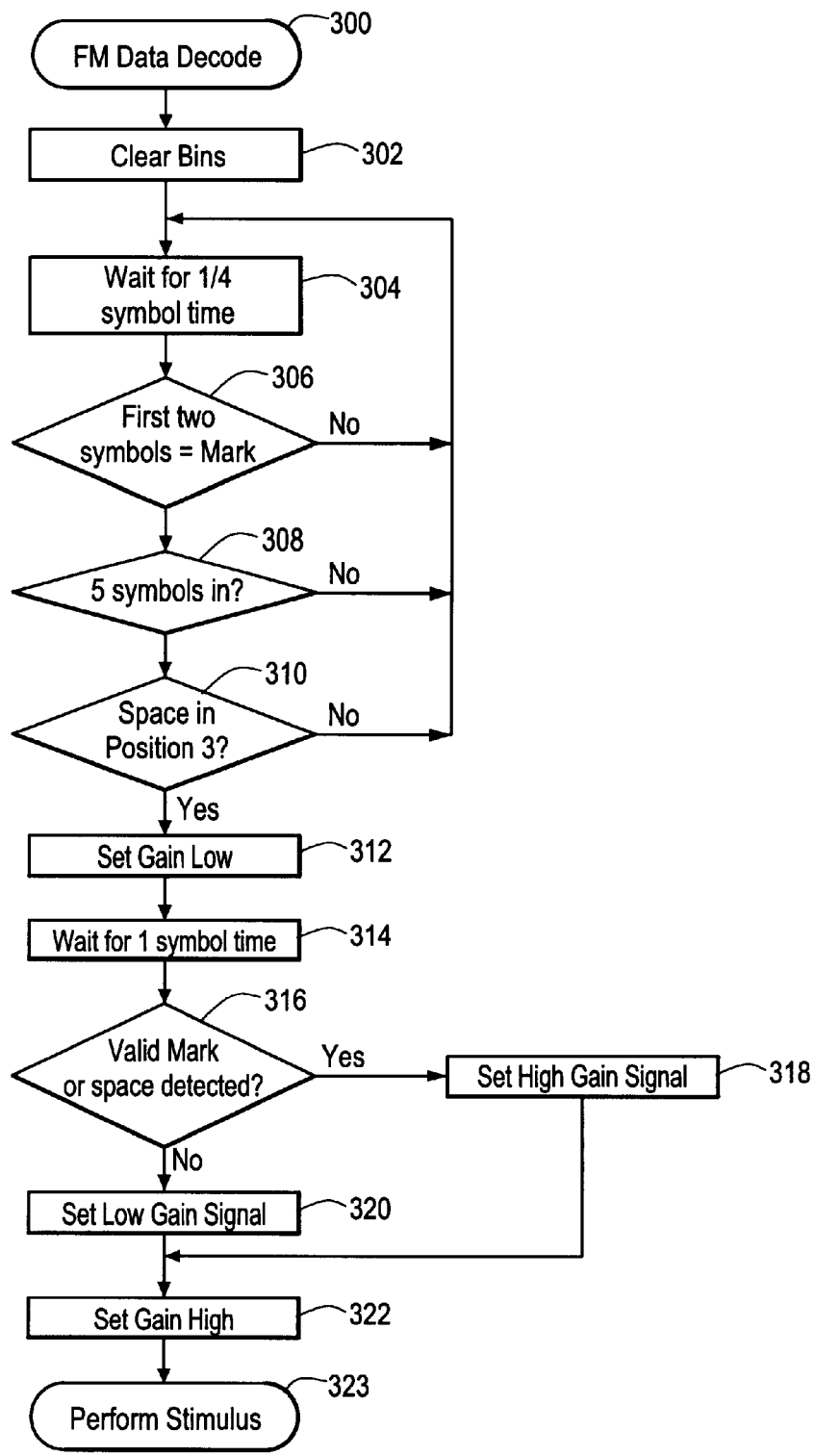
FIG. 11 is a flow chart of the decoding procedure executed by the signal processor of the receiver/stimulus unit.

The validation and decode of the FSK data stream is depicted in FIG. 11. A series of bins are employed to store data representing pulse width. The process (300) begins by clearing and then setting the bins to a known value (302). After waiting for a portion of a bit time (304) the bin is examined (306) to see if the first two bits are valid mark bits.

If not, the wait (304) is entered. If the first two bits are valid marks, and 5 data symbols have been received (308), the third position is examined (310) to see if a valid space bit has been received in that position. If not, the wait (304) is entered. If position 3 is a space, the gain is set low (312) and after a wait period (314) a valid mark or space is tested for (316). If a valid symbol is received, a high gain signal is recorded (318). If a valid symbol is not received, the signal is judged to be low gain (320). The gain is then set high (322) and bits 3 and 5 are recorded as the data bits. The stimulus is then performed (323).

Figure 12:
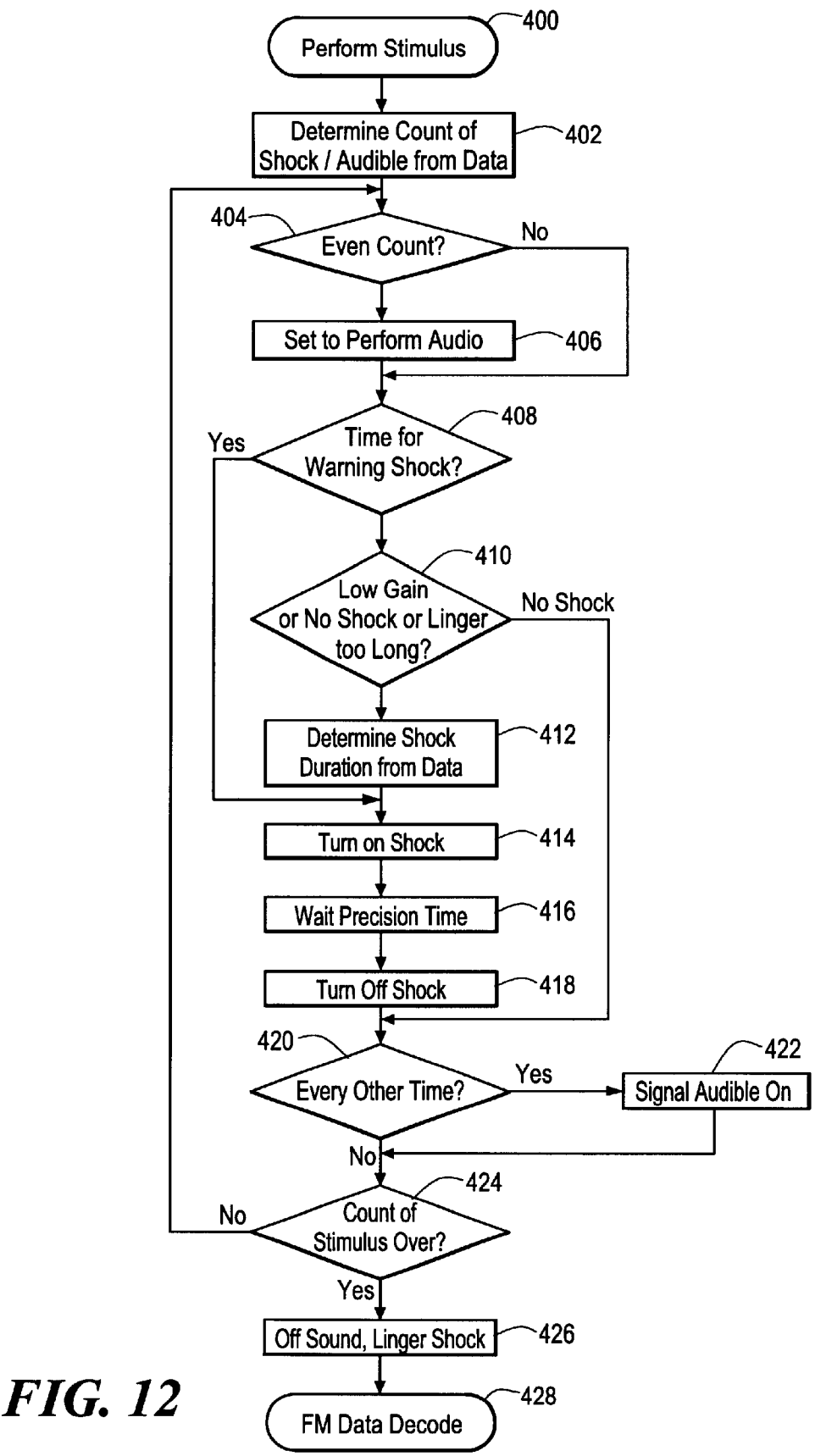
FIG. 12 is a flow chart of the stimulus action procedure executed by the receiver/stimulus unit.

The initiation of stimulus action (400) once a valid data stream is received and validated is shown in FIG. 12. The number of stimulus cycles is determined from the received code and switch settings (402). If the count of stimulus periods is odd (404) then a signal is set to perform audio stimulation if set (406). If sufficient time has elapsed for a shock stimulus (408) and high gain has been indicated and the transmitter has not lingered in the shock zone for too long (410) then the shock is begun by determining the shock duration from the data received (412). A shock is delivered by turning on the shock circuit (414), waiting a precision time (416), then turning off the shock circuit 418. At every other time signal cycle, the audible signal can be on (422). If the count of stimulus cycles in a stimulus period is not exhausted the shock cycle is begun again. If the number of shock cycles is finished (426), the audible request is turned off and any shock signal is turned off. The FSK decode process is begun again (428).

Figure 13:
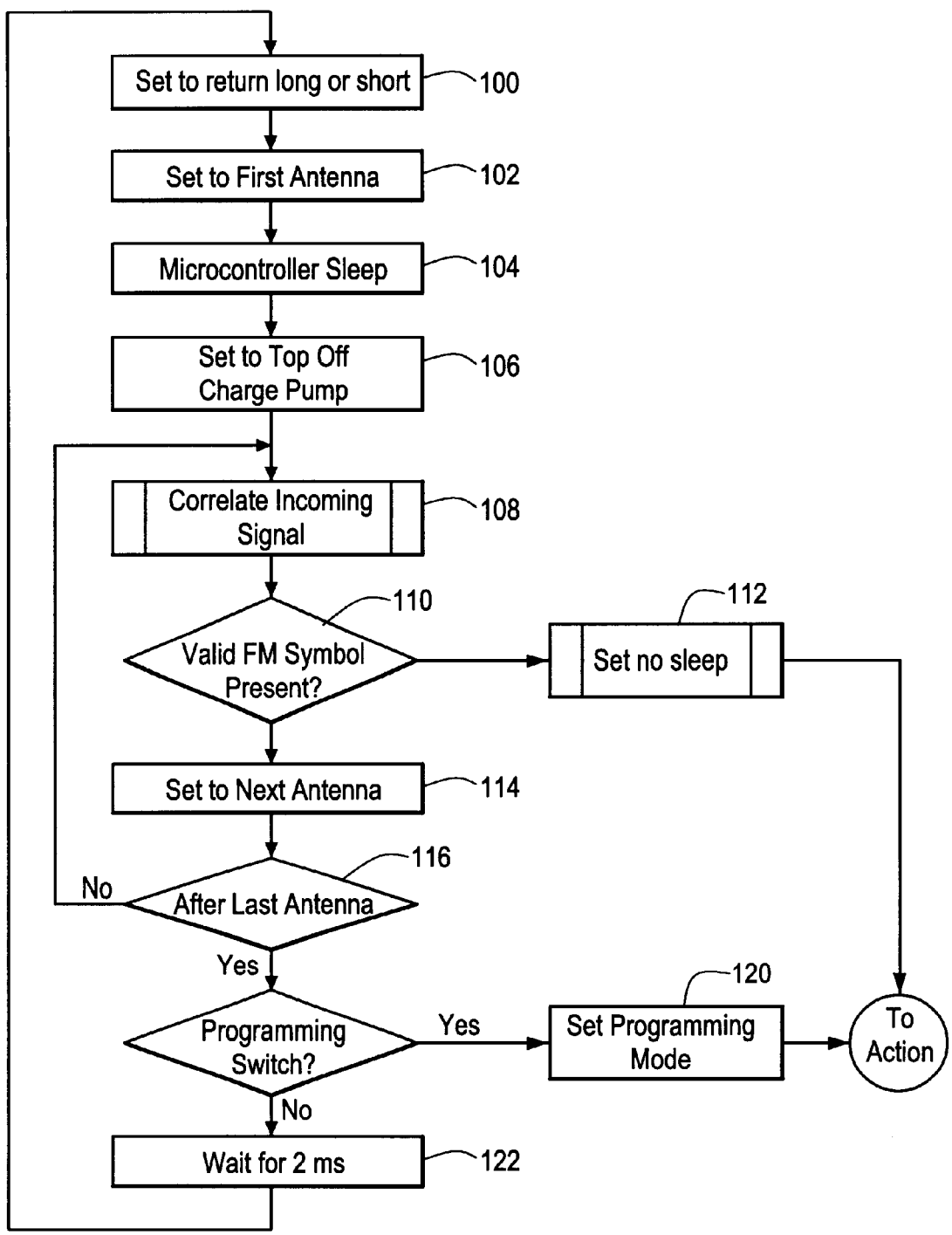
FIG. 13 is a flow chart of the sleep/wake procedure executed by the receiver/stimulus unit.

The Sleep/Wake operation is shown in FIG. 13. The microcontroller is maintained in a sleep state (100) and awakens at one of two fixed intervals which are typically 58 ms and 235 ms, which are selectable during programming of the system. The longer sleep time saves battery life, while the shorter sleep time provides some battery saving and a more rapid wake-up to more readily detect a signal from the transmitter. Before the microcontroller enters low power sleep (104) the first antenna is activated (102). Once the sleep time is completed the charge pump is set to be given a burst of voltage (106). A period for incoming signal correlation take place (108) and a test is made for a valid FSK symbol (110). If a signal is present, the sleep mode is deactivated for a period (112) and the general action loop is entered. If no valid signal is detected, the next antenna is selected (114) and a test determines if all antennas have been chosen (116). If there are still antennas left to test, the correlation test (108) is again begun. If the last antenna has been tested, the programming switch save register is tested to see any valid activations of the switch have taken place (118). If activations have taken place, the state machine for the programming mode is activated (120) and the main action loop entered. If no switch activations have taken place, a wait is entered after which the sleep cycle is again begun (100).

Figure 14:
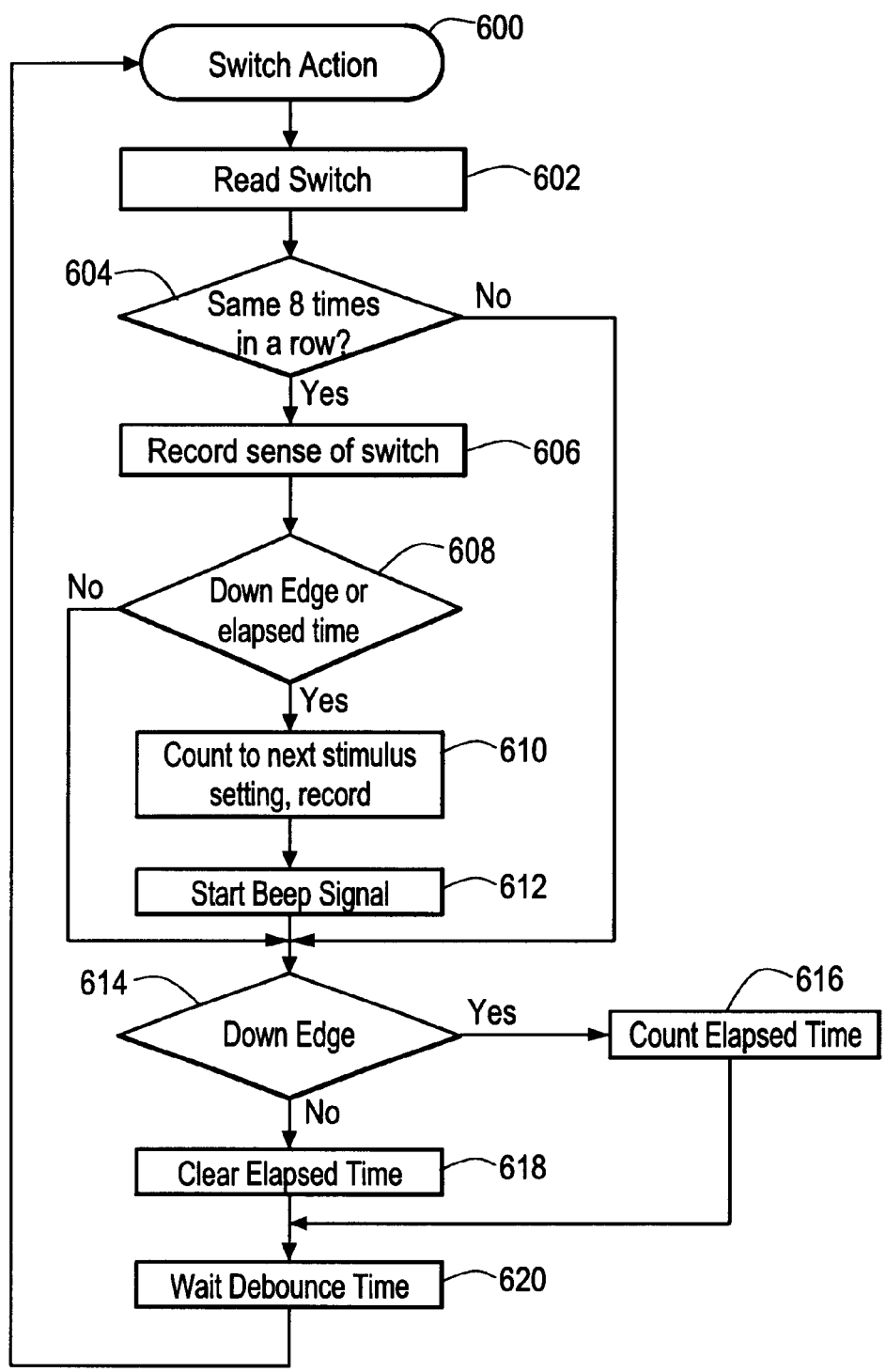
FIG. 14 is a flow chart of the switch validation procedure of the receiver/stimulus unit.

The method for validating switch entry (600) and the actions to be taken are shown in FIG. 14. First, the physical switch value is read (602) and compared with previous readings. If the readings are the same 8 times in a row (604) the sense of the switch is recorded (606). If a down edge has occurred or the switch dwell time has been exceeded (608), then the next stimulus level is selected with reset to the first level if the last level has been exceeded and the stimulus level is recorded in a non-volatile memory (610). An audible beep signal is started (612). If the switch remains in a depressed or down state, elapsed time for the switch dwell is counted (616). If the switch is in an undepressed state, the switch dwell time is set to 0. A predetermined wait is executed (620) before beginning the cycle again (600).

Having described preferred embodiments of the present invention it should be apparent to those of ordinary skill in the art that other embodiments and variations of the presently disclosed embodiment incorporating these concepts may be implemented without departing from the inventive concepts herein disclosed. Accordingly, the invention should not be viewed as limited to the described embodiments but rather should encompass the full scope and spirit of the appended claims.

What is claimed is:

1. A system for controlling the movement of an animal, comprising:
   a transmitter/control unit for generating a coded frequency shift keyed (FSK) waveform, said coded FSK waveform including modulated data including a sequence of predetermined intervals having predetermined characteristics;
   an antenna coupled to the transmitter/control unit for radiating said coded FSK waveform in a defined area; and
   a receiver/stimulus unit for receiving and demodulating said coded FSK waveform radiated by said antenna and for applying to said animal a stimulus upon qualification of said received and demodulated coded FSK waveform.

2. The system of claim 1 wherein said receiver/stimulus unit includes a collar removably mounted on and in contact with said animal.

3. The system of claim 1 wherein said stimulus comprises an audible alarm.

4. The system of claim 1 wherein said stimulus comprises an electrical shock.

5. The system of claim 1 wherein said antenna comprises a loop of cable.

6. The system of claim 1 wherein said animal is contained within said area defined by said antenna.

7. The system of claim 1 wherein said animal is restricted from said area defined by said antenna.

8. The system of claim 1 wherein said receiver/stimulus unit includes a microcontroller.

9. The system of claim 8 wherein said microprocessor is reprogrammable by mating said receiver with a programming interface.

10. The system of claim 9 wherein said programming interface interconnects to said microprocessor through a battery compartment of said receiver.

11. The system of claim 8 wherein said microcontroller is configured as a digital signal processor.

12. The system of claim 8 wherein said microcontroller functions as a flash programmable microprocessor.

13. The system of claim 1 wherein the receiver/stimulus unit includes an antenna assembly having three antennas arranged along mutually orthogonal axes.

14. The system of claim 13 wherein the receiver/stimulus unit further includes a front end circuit coupled to the antenna assembly, a signal processor circuit, a warning circuit, a shock application circuit and electrodes which are attachable to the skin of an animal.

15. The system of claim 14 wherein the front end circuit of the receiver/stimulus unit includes a plurality of amplifiers each associated with a respective one of the plurality of antennas, and circuitry for sequential enabling of the amplifiers.

16. The system of claim 13 wherein said receiver/stimulus unit further comprises a plurality of amplifiers, a respective amplifier of said plurality of amplifiers in electrical communication with a respective antenna of said plurality of antennas.

17. The system of claim 1 wherein said receiver/stimulus unit discriminates a frequency characteristic of said coded FSK waveform.

18. The system of claim 1 wherein said coded FSK waveform is disabled a predetermined portion of a cycle time.

19. The system of claim 18 wherein said predetermined portion of a cycle time comprises approximately thirty percent.

20. The system of claim 1 wherein said receiver/stimulus unit qualifies a received coded FSK waveform by detecting a presence of the sequence of predetermined intervals having predetermined characteristics.

21. The system of claim 20 wherein said sequence of predetermined intervals having predetermined characteristics comprises two intervals of a Mark frequency, at least one data bit, a Space frequency, at least one data bit, and a stop sequence.

22. The system of claim 1 wherein said sequence of predetermined intervals having predetermined characteristics comprises two intervals at a Mark frequency, a most significant bit (MSB) data bit interval, one interval at a Space frequency, a least significant bit (LSB) data bit interval, a gain test sequence.

23. The system of claim 22 wherein said Space frequency comprises a signal approximately 2.5% below a carrier frequency.

24. The system of claim 23 wherein said carrier frequency comprises approximately 8192 Hz.

25. The system of claim 23 wherein said Space frequency comprises approximately 7990 Hz.

26. The system of claim 22 wherein said Mark frequency comprises a signal approximately 2.5% above a carrier frequency.

27. The system of claim 26 wherein said carrier frequency comprises approximately 8192 Hz.

28. The system of claim 26 wherein said Mark frequency comprises approximately 8403 Hz.

29. The system of claim 1 wherein the transmitter/control unit generates a coded frequency shift keyed waveform modulated to either a Mark frequency or a Space frequency.

30. The system of claim 29 wherein the transmitter/control unit generates a FSK waveform having a frame structure that includes a leader sequence, a data portion and a gain test sequence.

31. The system of claim 30 wherein the leader sequence indicates the start of a frame, the data portion specifies the type and rate of stimulus applied to the animal and the gain test sequence is used to equalize receiver response to the Mark and Space frequencies.

32. The system of claim 1 wherein the transmitter/control unit is battery powered and is operative with very low power consumption.

33. The system of claim 1 wherein the receiver/stimulus unit is battery powered and operative with very low power consumption and having a sleep mode to conserve power.

34. The system of claim 1 wherein the receiver/stimulus unit includes a programmable memory for programming of intended system parameters.

35. The system of claim 1 wherein the receiver/stimulus unit includes a reed switch activated by a magnetic probe for programming of operating modes.

36. The system of claim 1 wherein the receiver/stimulus unit includes a multi-pin programming connector for use with a programming probe for reprogramming of the microcontroller memory.

37. The system of claim 1 wherein the receiver/stimulus unit is battery powered and includes a circuit to provide a continuous voltage higher than the battery voltage to energize the circuitry of the receiver/stimulus unit.

38. For use in the system for controlling the movement of an animal in which a loop antenna is energized by a transmitter to provide a radiation field detectable by a receiver worn by the animal, the receiver being operative to provide a stimulus to the animal upon of a valid detection of the radiated field, a receiver comprising:

an antenna assembly including a plurality of antenna coils mounted on a first circuit board, the antenna coils being disposed along mutually orthogonal axes, and capacitors mounted on the first circuit board in circuit association with the antenna coils;

a second circuit board containing power and receiver circuitry, stimulus circuitry and a battery mount;

a connector for connecting the first circuit board to the second circuit board.

39. The receiver of claim 38 further including a waterproof enclosure within which the first and second circuit boards and associated components are disposed;

a removable cap for providing access to a battery compartment for installation of a battery;

a pair of electrodes having ends disposed on an outside surface of the enclosure and configured for contact with an animal's skin for application of a stimulus.

40. The receiver of claim 39 wherein the first circuit board includes a multi-pin socket accessible via the battery compartment for engagement of a multi-pin probe for programming of the microprocessor memory.

41. A system for controlling the movement of an animal, comprising:

a transmitter/control unit for generating a frequency shift keyed (FSK) waveform said coded FSK waveform including modulated data including a sequence of predetermined intervals having predetermined characteristics;

an antenna coupled to the transmitter/control unit for radiating said FSK waveform in a defined area; and a receiver/stimulus unit for receiving and demodulating said FSK waveform radiated by said antenna and for applying to said animal a stimulus upon qualification of said received and demodulated FSK waveform by detecting a presence of the sequence of the predetermined intervals having predetermined characteristics.

42. The system of claim 41 wherein the receiver/stimulus unit includes a circuit to provide a continuous voltage of a level sufficient to energize the circuitry of the receiver/stimulus unit.

43. The system of claim 41 wherein the receiver/stimulus unit is battery powered and includes a circuit to provide a continuous voltage higher than the battery voltage to energize the circuitry of the receiver/stimulus unit.

* * * * *